United States Patent
Hwang et al.

(10) Patent No.: US 9,877,051 B2
(45) Date of Patent: Jan. 23, 2018

(54) METHOD AND APPARATUS FOR SYNCHRONIZING MEDIA DATA OF MULTIMEDIA BROADCAST SERVICE

(71) Applicants: Samsung Electronics Co., Ltd., Suwon-si, Gyeonggi-do (KR); UNIVERSITY OF SEOUL INDUSTRY COOPERATION FOUNDATION, Seoul (KR)

(72) Inventors: Sung-Oh Hwang, Yongin-si (KR); Yong-Han Kim, Seongnam-si (KR); Kyung-Mo Park, Seoul (KR); Sung-Ryeul Rhyu, Yongin-si (KR)

(73) Assignees: Samsung Electronics Co., Ltd., Suwon-si (KR); UNIVERSITY OF SEOUL INDUSTRY COOPERATION FOUNDATION, Seoul (KR)

(*) Notice: Subject to any disclaimer, the term of this patent is extended or adjusted under 35 U.S.C. 154(b) by 339 days.

(21) Appl. No.: 13/624,328

(22) Filed: Sep. 21, 2012

(65) Prior Publication Data

US 2013/0074141 A1    Mar. 21, 2013

(30) Foreign Application Priority Data

Sep. 21, 2011  (KR) .................. 10-2011-0095458
Apr. 30, 2012  (KR) .................. 10-2012-0045360

(51) Int. Cl.
*H04N 21/242*   (2011.01)
*H04N 21/43*    (2011.01)
(Continued)

(52) U.S. Cl.
CPC ....... *H04N 21/242* (2013.01); *H04N 21/2362* (2013.01); *H04N 21/4307* (2013.01); *H04N 21/8126* (2013.01); *H04N 21/8547* (2013.01)

(58) Field of Classification Search
CPC ............ H04N 21/242; H04N 21/8547; H04N 21/8126; H04N 21/4307
See application file for complete search history.

(56) References Cited

U.S. PATENT DOCUMENTS 8,015,588 B2 * 9/2011 Champel ................ H04L 29/06
                                                    725/116
8,208,460 B2   6/2012 Tighe et al.
(Continued)

FOREIGN PATENT DOCUMENTS

CN    1484920 A    3/2004
CN    1531346 A    9/2004
(Continued)

OTHER PUBLICATIONS

Technologies under Consideration (TuC) for MMT, ISO/IEC JTC1/SC29/WG11 N11953, Mar. 2011, Geneva, Switzerland.
(Continued)

*Primary Examiner* — Robert Hance
*Assistant Examiner* — Susan X Li
(74) *Attorney, Agent, or Firm* — Jefferson IP Law, LLP

(57) ABSTRACT

A method and an apparatus for synchronizing media data and auxiliary data received by a service through a broadcast network or a communication network in a multimedia broadcast service are provided. The method includes receiving regular media data provided for a broadcast service, receiving and storing control information regarding adjunct media data comprising auxiliary data regarding the regular media data, determining location information of the adjunct media data included in the control information, and receiving and storing the adjunct media data according to the location information. If an identifier of the adjunct media data is included in a header of the regular media data, reading the stored adjunct media data corresponding to the identifier of the adjunct media data, and executing the
(Continued)

adjunct media data in synchronization with the regular media data according to synchronization information included in the header.

8 Claims, 7 Drawing Sheets

(51) Int. Cl.
*H04N 21/8547* (2011.01)
*H04N 21/2362* (2011.01)
*H04N 21/81* (2011.01)

(56) References Cited

U.S. PATENT DOCUMENTS

| | | | |
|---|---|---|---|
| 9,060,193 B2 | 6/2015 | Whiteing | |
| 2002/0171765 A1* | 11/2002 | Waki et al. | 348/589 |
| 2003/0090711 A1 | 5/2003 | Yoshii et al. | |
| 2004/0075678 A1 | 4/2004 | Kazui et al. | |
| 2004/0078812 A1 | 4/2004 | Calvert | |
| 2007/0050833 A1 | 3/2007 | Park | |
| 2007/0208750 A1 | 9/2007 | Carmeli et al. | |
| 2008/0115176 A1* | 5/2008 | Rodriguez | 725/89 |
| 2010/0049863 A1 | 2/2010 | Lee et al. | |
| 2010/0141738 A1 | 6/2010 | Heuer et al. | |
| 2010/0295992 A1 | 11/2010 | Lee et al. | |
| 2011/0013888 A1* | 1/2011 | Sasaki | G11B 27/034 386/353 |
| 2011/0141361 A1 | 6/2011 | Yoshigahara | |
| 2012/0185905 A1* | 7/2012 | Kelley | H04N 9/75 725/109 |

FOREIGN PATENT DOCUMENTS

| | | |
|---|---|---|
| CN | 101030226 A | 9/2007 |
| JP | 2004-140488 A | 5/2004 |
| JP | 2004-235734 A | 8/2004 |
| JP | 2005-159743 A | 6/2005 |
| JP | 2007-068172 A | 3/2007 |
| JP | 2011-124958 A | 6/2011 |
| KR | 10-0678906 B1 | 2/2007 |
| NO | 02-37841 A1 | 5/2002 |

OTHER PUBLICATIONS

MPEG Media Transport (MMT) Context and Objective, ISO/IEC JTC1/SC29/WG11 N11541, Jul. 2010.
Use Cases for MPEG Media Transport (MMT), ISO/IEC JTC1/SC29/WG11 N11542, Jul. 2010.
Requirements on MPEG Media Transport (MMT), ISO/IEC JTC1/SC29/WG11 N11540, Jul. 2010.
Specification for the carriage of synchronized auxiliary data in DVB transport streams, ETSI TS 102 823 V1.1.1, Digital Video Broadcasting (DVB), Nov. 2005.
Working Draft 2.0 of MPEG Media Transport, ISO/IEC JTC1/SC29/WG11 N11953, Geneva, Switzerland.
Information technology—Generic coding of moving pictures and associated audio information—Part 6: Extensions to DSM-CC, ISO/IEC 13818-6:1998, Sep. 1, 1998.
Information technology—Generic coding of moving pictures and associated audio information—Part 1: Systems, 3rd Edition, ISO/IEC 13818-1:2007, Oct. 15, 2007.
XP030050077 "Proposal for MMT C.1 Layer Design: signaling and synchronization methods for auxiliary data in MMT", Oct. 23, 2011.
XP030018664 "Working Draft of MPEG Media Transport", Aug. 24. 2011.
XP030048970 "Proposed for E.1 Layer about Composition information", Jun. 15, 2011.
"5. SMIL3.0 Timing and Synchronization", Dec. 1, 2008.

* cited by examiner

“METHOD AND APPARATUS FOR SYNCHRONIZING MEDIA DATA OF MULTIMEDIA BROADCAST SERVICE”

PRIORITY

This application claims the benefit under 35 U.S.C. § 119(a) of a Korean patent application filed on Sep. 21, 2011 in the Korean Intellectual Property Office and assigned Serial No. 10-2011-0095458 and a Korean patent application filed on Apr. 30, 2012 in the Korean Intellectual Property Office and assigned Serial No. 10-2012-0045360, the entire disclosure of each of which is hereby incorporated by reference.

BACKGROUND OF THE INVENTION

1. Field of the Invention

The present invention relates to a multimedia broadcast service. More particularly, the present invention relates to a method and an apparatus for synchronizing media data and auxiliary data, which are received by a receiver from a broadcast network or a communication network, with each other in a heterogeneous network environment.

2. Description of the Related Art

Generally, in a multimedia service, audio, or video accompanied by audio (hereinafter, referred to as 'regular media'), is provided and in some cases, when needed, auxiliary data (hereinafter, referred to as 'adjunct media'), such as web documents, widgets, interactive applications, audio clips, video clips, graphics, texts, images, and the like, is provided together with the regular media. Some adjunct media may be provided temporally irrespective of regular media (hereinafter, referred to as 'unscheduled adjunct media'), and when the adjunct media needs to be associated with the content of the regular media, the adjunct media may be provided to be played temporally in synchronization with a related part of the content of the regular media (hereinafter, referred to as 'scheduled adjunct media'). In the latter, playing the adjunct media in synchronization with the related part of the content of the regular media is referred to as "media synchronization".

The unscheduled adjunct media does not need to be synchronized with the content of the regular media, such that the receiver, upon receiving the unscheduled adjunct media, immediately plays the received unscheduled adjunct media. On the other hand, the scheduled adjunct media starts being played in a part related thereto in the content of the regular media, and in spite of some variations depending on characteristics of the adjunct media, the play of the scheduled adjunct media is terminated at the request of a user, upon occurrence of a channel change, or upon exhaustion of the adjunct media data.

The Digital Video Broadcasting (DVB) standard of the related art, European Telecommunication Standard Institute (ETSI) Telecommunications Standard (TS) 102 823 V1.1.1 (2005-11) defines data similar to the adjunct media as auxiliary data. In this specification, according to the Moving Picture Experts Group (MPEG) Media Transport (MMT) standards (International Organization for Standardization (ISO)/International Electrotechnical Commission (IEC) Joint Technical Committee 1 (JTC1)/SubCommittee 29 (SC29)/Working Group 11 (WG11)), the concept of auxiliary data is extended to be suitable for smart TeleVisions (TVs) in a heterogeneous network environment in which data is received using both a broadcast network and the Internet. In the MMT standards, the term "asset" is used as a concept similar to a stream. In this specification, a partial media stream indicating a partial media compression data stream is added to web documents, widgets, interactive applications, audio clips, video clips, graphics, texts, images, and the like, of a broadcast standard of the related art, and they will be defined as adjunct assets. A compression data stream of the regular media is defined as a regular asset.

FIG. 1 illustrates a partial media stream according to the related art.

Referring to FIG. 1, stereoscopic video includes left-eye view and right-eye view images, among which left-eye images 111, 113, and 115 are transmitted as a regular asset 110 and a right-eye image 121 is transmitted as an adjunct asset 120 only for a predefined period (e.g., for 1 minute). In this case, a receiver previously downloads the adjunct asset 120 over the Internet, and plays the adjunct asset 120 in frame-wise synchronization with the regular asset 110 when receiving the regular asset 110 in real time over a broadcast network, thereby presenting a stereoscopic video service in a time period of a predefined duration.

The MPEG-2 Digital Storage Media-Command and Control (DSM-CC) standard of the related art (ISO/IEC 13818-6:1998) or Digital Video Broadcasting (DVB) standard (ETSI TS 102 823 V1.1.1) separately configures and uses a timeline per program item, instead of a media synchronization clock, a System Time Clock (STC) of the MPEG-2, to synchronize content metadata or auxiliary data with audio or video. This is because, due to the possible existence of a non-contiguous point in a Program Clock Reference (PCR) based on the STC, the PCR cannot be used to configure a contiguous timeline which increases at a fixed rate from start to end of a program item. The timeline per program item is called as a metadata content timeline in the MPEG-2 DSM-CC standard, and is referred to as a DVB broadcast timeline in the DVB standard. Although the timelines in the two standards are different in terms of configuration scheme and name, they both are timelines for synchronization between regular media and adjunct media (hereinafter, referred to as a 'media timeline'). Based on a media timeline of the related art, metadata is associated with a video segment or auxiliary data is executed in synchronization with video.

FIGS. 2A through 2D illustrate synchronization of an application according to a metadata content timeline in an MPEG-2 DSM-CC standard according to the related art.

Referring to FIGS. 2A through 2D, the application is an adjunct asset and is being synchronized with video, which is a regular asset. FIG. 2C illustrates a metadata content timeline for video of a regular program. This timeline is a continuous timeline over a play time from start to end of a video, but if due to a need for edition in a studio, the edition is made such that a new scene starts from a minute-based time, a discontinuous period of 1 minute or less may be included. FIG. 2D illustrates a metadata content timeline of an advertisement to be inserted between programs shown in FIG. 2C. In FIGS. 2A through 2D, there is an application, which is an adjunct asset to be executed (or run) at a particular point in time during the advertisement as intended by an advertisement creator. FIG. 2B illustrates a timeline according to an STC of the MPEG-2 system standard in a case of transmission of FIGS. 2C and 2D over a broadcast network. On an STC-based timeline, a discontinuous period may exist due to stream edition, stream splicing, or the like. To designate a particular time point on the STC-based timeline and execute an application in the designated time point, an STC at a corresponding time point, which changes every transmission of the same advertisement, has to be newly read and transmitted as a Presentation TimeStamp (PTS) of the application. In the MPEG-2 DSM-CC standard, to avoid this inconvenience, transmission is made as shown in FIG. 2A, but a time point at which the application has to be executed is designated based on a metadata content timeline B. In this case, a time with a relative time difference from an advertisement start point is designated as the time point for execution of the application, such that the execution time point is fixed without changing every transmission of the advertisement. However, for such synchronization, the receiver has to reconfigure, maintain, and manage a metadata content timeline A and the metadata content timeline B.

In order for the receiver to configure the media timeline as shown in FIGS. 2A through 2D, a server has to transmit control information for media timeline configuration as a separate stream. This process needs a separate TS packet stream, and a separate Packet Identifier (PID) has to be assigned to this stream. Moreover, the server needs to periodically transmit various descriptors through the separate stream, and the receiver needs to configure the media timeline by reading and handling the descriptors. In addition, for synchronization between a regular media and an adjunct media, a value on a media timeline regarding an adjunct media start point has to be delivered in a timestamp attached to the adjunct media, and the receiver has to convert this timestamp into a value on the STC, thus achieving media play synchronization.

FIG. 3 illustrates an application synchronization according to a DVB broadcasting timeline in a DVB standard (ETSI TS 102 823 V1.1.1) according to the related art.

To deliver the DVB broadcasting timeline to a receiver, the server incorporates a PTS into a header to deliver broadcast_timeline_descriptor through a Packetized Elementary Stream (PES) packet, and periodically transmits information of a pair (DVB broadcasting timeline value, PTS value). A timeline of each program segment is determined based on the DVB broadcasting timeline.

Referring to FIG. 3, a time of each program segment does not necessarily start from 0 and DVB broadcasting timelines of a regular program and an advertisement are continuous to each other. This is intended to prevent a reception side from detecting a discontinuous point on the DVB broadcasting timelines and deleting only the advertisement. An STC value corresponding to a point (3), a time point at which an application is to be executed, may be estimated by extrapolation using information of two pairs (i.e., a DVB broadcasting timeline value and a PTS value) transmitted immediately before the point (3), that is, points (1) and (2). Moreover, the reception side has to configure, maintain, and manage a media timeline, and thus a transmission side has to transmit control information for the media timeline and a receiver has to periodically read and process the control information.

Therefore, a need exists for a synchronization method and an apparatus capable of achieving synchronization between regular media and adjunct media without configuring a media timeline.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a synchronization method and an apparatus capable of achieving synchronization between regular media and adjunct media without configuring a media timeline.

Exemplary embodiments of the present invention provide a synchronization method and an apparatus, by which auxiliary data associated with media, which is received by a receiver over a broadcast network or a communication network, can be played together with the media in synchronization with the content of the media at a time point designated by a media service provider.

According to an aspect of the present invention, a method for synchronizing data in a multimedia broadcast service is provided. The method includes receiving and storing Composition Information (CI) for a broadcast service, determining location information of primary media data provided for the broadcast service from the CI, and receiving the primary media data according to the location information, determining location information of adjunct media data including auxiliary data regarding the primary media data, included in the CI, and receiving and storing the adjunct media data according to the location information, and determining start information of the adjunct media data included in the CI and executing the adjunct media data in synchronization with regular media data associated with the start information.

According to another aspect of the present invention, a reception apparatus for synchronizing data in a multimedia broadcast service is provided. The reception apparatus includes a decoder for receiving and decoding regular media data provided for a broadcast service, an adjunct media information storage for receiving and storing CI for the broadcast service, an adjunct media data cache for determining location information of adjunct media data including auxiliary data regarding the primary media data, included in the CI, and receiving and storing the adjunct media data according to the location information, and an executor for determining start information of the adjunct media data included in the CI and executing the adjunct media data in synchronization with the regular media data associated with the start information.

According to another aspect of the present invention, a method for synchronizing data in a multimedia broadcast service is provided. The method includes receiving regular media data provided for a broadcast service, receiving and storing control information regarding adjunct media data including auxiliary data regarding the regular media data, determining location information of the adjunct media data included in the control information, and receiving and storing the adjunct media data according to the location information, and if an identifier of the adjunct media data is included in a header of the regular media data, reading the stored adjunct media data corresponding to the identifier of the adjunct media data, and executing the adjunct media data in synchronization with the regular media data according to synchronization information included in the header.

According to another aspect of the present invention, a reception apparatus for synchronizing data in a multimedia broadcast service is provided. The reception apparatus includes a decoder for receiving and decoding regular media data provided for a broadcast service, an adjunct media information storage for receiving and storing control information regarding adjunct media data including auxiliary data regarding the regular media data, an adjunct media data cache for determining location information of the adjunct media data included in the control information, and receiving and storing the adjunct media data according to the location information, and an executor for, if an identifier of the adjunct media data is included in a header of the regular media data, reading the stored adjunct media data corresponding to the identifier of the adjunct media data, and executing the adjunct media data in synchronization with the regular media data according to synchronization information included in the header.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
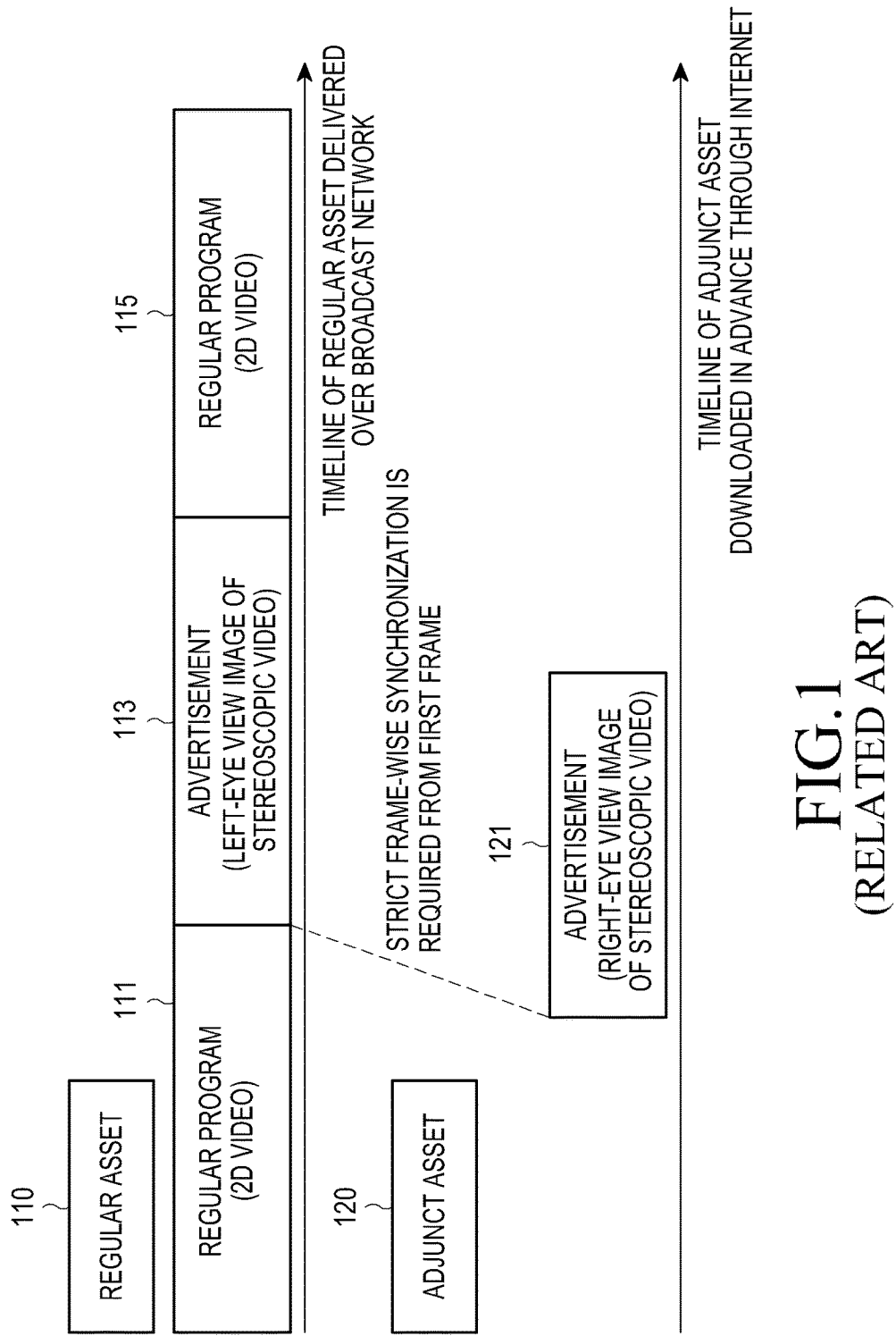
FIG. 1 illustrates a partial media stream according to the related art.
Figure 2:
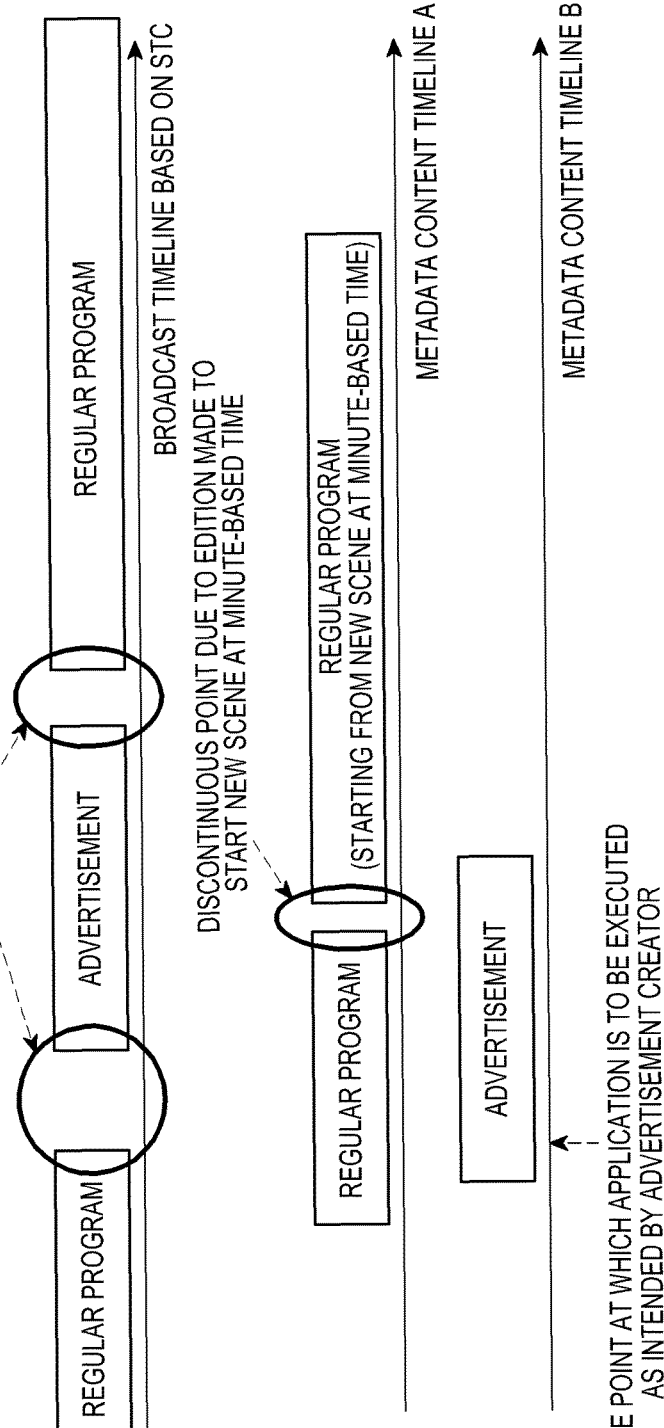
FIGS. 2A through 2D illustrate synchronization of an application according to a metadata content timeline in a Moving Picture Experts Group-2 (MPEG-2) Digital Storage Media-Command and Control (DSM-CC) standard according to the related art.
Figure 3:
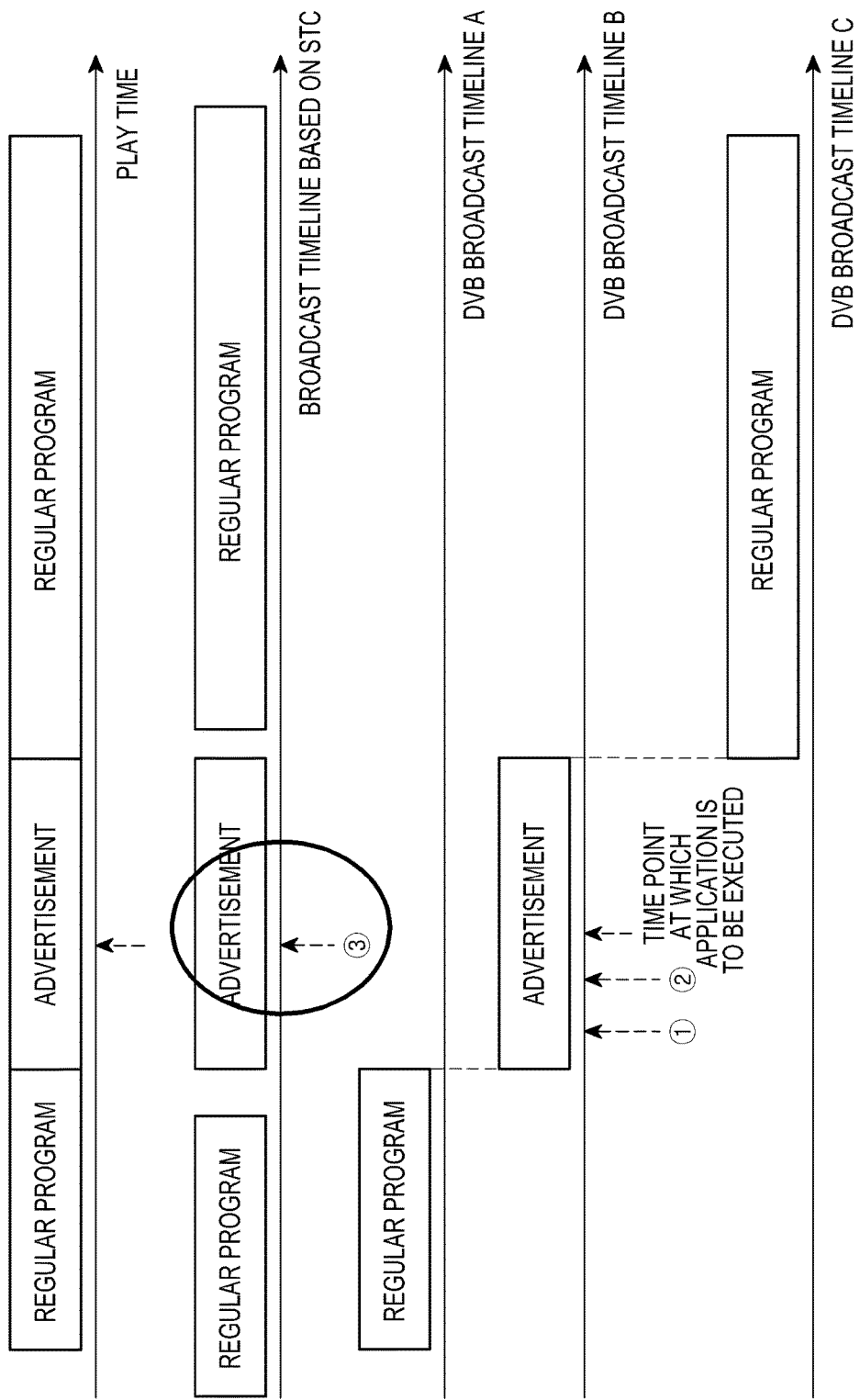
FIG. 3 illustrates an application synchronization according to a Digital Video Broadcasting (DVB) broadcasting timeline in a DVB standard (European Telecommunication Standard Institute (ETSI) Telecommunications Standard (TS) 102 823 V1.1.1) according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

First, before undertaking a description of the exemplary embodiments of the present invention, terms used herein will be defined as below.

Media Service: A service which delivers information by using one or more of various media, such as audio, video, images, texts, graphics, interactive applications, and the like.

Foreground Media Service: A free or charged media product directly exposed to a viewer to allow the viewer to select and enjoy at a time point, such as a video service, an audio service, an Electronic Program Guide (EPG) service, a push Video on Demand (VoD) service, a portable service, and the like.

Background Broadcast Service: A media delivery service which assists the foreground media service, but is not directly exposed to a viewer, such as a carousel for file download, pre-download over the Internet, and the like.

Video Service: A service in which video is the primary, and accompanying audio is certainly provided together, and audio, a subtitle, an interactive application, other additional data, and the like, in another language may also be provided together with the video.

Audio Service: A service in which audio is the primary, and video or image, an interactive application, and other additional data associated with the audio may be provided together with the audio.

Interactive Application: Software which is executed during consumption of a video or an audio service, provides information to a viewer, and receives a viewer's reaction to control a media service or deliver information to a server of a media operator, and collectively refers to software in a declarative and procedural language. This application may be called by a media operator in association with a currently consumed video or audio service or may be called by a media operator regardless of a currently used media service. An interactive application already stored in a receiver's cache and recognized by a viewer may be called at the request of the viewer.

Regular Media: Media which needs to be provided due to requirements of a media service. For example, audio of an audio service or video and audio of a video service accompanied by audio.

Adjunct Media: Media which do not need to be provided due to requirements of a media service, but may be provided when needed. For example, this media may include web documents, widgets, interactive applications, audio clips, video clips, graphics, texts, images, an auxiliary media component, or the like. The adjunct media is consumed together with regular media at all times, and cannot be consumed alone.

Media Component: A component which constitutes media. For example, in a case of stereoscopic video, a left-eye view image and a right-eye view image may be media components. As another example, in a case of 5.1-channel audio, each channel audio may be a media component.

Auxiliary Media Component: A media component which cannot constitute a single media alone, and constitutes the media together with another media component. For example, in a situation where a left-eye view image is provided as a 2-Dimensional (2D) image at all times among a left-eye view and a right-eye view images in a 2D/3-Dimensional (3D) time combined service, the right-eye view image provided only in a stereoscopic video period is an auxiliary media component.

Asset: Encoding data regarding a media component. Herein, encoding refers to compressive encoding, encoding for a standard format, and the like.

Regular Asset: Encoding data regarding a media component of regular media. Herein, encoding refers to compressive encoding, encoding for a standard format, and the like.

Adjunct Asset: Encoding data regarding a media component or auxiliary media component of adjunct media. Herein, encoding refers to compressive encoding, encoding for a standard format, and the like.

Program: An instance of a media service (i.e., the entire content of one broadcast channel).

Program Item: The content of a time period set of a program. For example, when a start advertisement, intermediate advertisements, and a last advertisement are transmitted in a mixed manner in a movie, the program item is the content of a time period of the movie including the advertisement. Herein, each advertisement is an individual program item, but it is an embedded program item included in another program item. The program is a result of concatenation of program items except for the embedded program item on a timeline.

Package: Encoding data for a program item. This includes assets and control information associated with transmission, decoding, reproduction, and the like, of the assets.

Primary Asset: A regular asset which can include synchronization information regarding an adjunct asset among regular assets. For example, the primary asset may include synchronization and control information of an adjunct asset as attached information of an M-Unit of a video stream.

Attached Information: Additional information regarding an asset, such as control information, description information, and the like. The attached information is a logical term, may be included in a header of multiple layers in a transport hierarchy, and in this case, it is called header information.

Stream Asset: An asset in the form of a media compression data, which can be temporally-infinitely generated like a video stream or an audio stream.

Non-Stream Asset: An asset which does not correspond to a stream asset.

M-Unit: A sub-component of an asset. It is also called a Moving Picture Experts Group (MPEG) Media Transport (MMT) Processing Unit (MPU). An M-Unit of a stream asset is a minimum data unit which can be input to a media decoder at a time, and a decoding result thereof may be presented at a time point or in a time period according to media. For example, for a video stream, a result of compression of a frame may be one M-Unit, and for an audio stream, a result of compression of an audio sample for 24 ms may be one M-Unit.

Hereinafter, a synchronization method according to an exemplary embodiment of the present invention will be described with reference to the accompanying drawings.

To control synchronization between a regular asset and an adjunct asset, considerations need to be made as below.

To synchronize a start time point of an adjunct asset with a desired time point on a timeline of a primary asset, the synchronization has to be performed frame-wise. Synchronization has to be performed precisely, such that when a primary asset is video, synchronization is performed video-frame-wise. For an audio primary asset, audio-frame-wise synchronization is performed. A mechanism for achieving synchronization needs to be as efficient as possible. For example, a configuration of signaling information which needs to be transmitted for synchronization needs to be as simple as possible, and the amount of data of the signaling information needs to be as small as possible. The adjunct asset which can be synchronized to the primary asset has to include not only a non-stream auxiliary media component, such as web documents, widgets, interactive applications, audio clips, video clips, graphics, texts, images, and the like, but also a stream auxiliary media component. In addition, a receiver needs to be able to identify an adjunct asset type, such as web documents, widgets, interactive applications, audio clips, video clips, graphics, texts, images, an auxiliary media component, or the like. The adjunct asset needs to be executed at one or more of a time point designated by a broadcaster, a time point at which downloading of the adjunct asset in the receiver is completed, a time point selected by a viewer, and a time point at which the adjunct asset is called from another adjunct asset. An adjunct asset identifier has to be assigned such that an adjunct asset can be globally uniquely identified for a predefined period needed for execution of the adjunct asset. As a location from which the adjunct asset is to be read, a carousel in a broadcast channel provided by the same broadcaster or an Internet Uniform Resource Locator (URL) needs to be designated. When an adjunct asset includes several files, a start file (e.g., a start page for a web document) needs to be designated. When the location for reading the adjunct asset therefrom is designated, an efficient presentation method needs to be used. It is imperative to inform the receiver of whether an adjunct asset is bound to a media service. The adjunct asset bound to a media service is automatically terminated upon termination of the media service. It is also imperative to inform the receiver of whether execution of the adjunct asset is safe. To this end, a broadcaster may directly create an adjunct asset or determine if execution of the adjunct asset is safe, and inform the receiver that the adjunct asset is safe. When several adjunct assets have to be executed at the same time, priority orders of the adjunct assets need to be informed to the receiver. A structure of adjunct asset description information needs to be extendible compatibly with an old system. For example, the adjunct asset description information needs to have a structure in which a subsequent descriptor can be added without causing malfunction of the receiver which supports an old system.

Hereinafter, an exemplary synchronization method for satisfying the following requirements will be described.

FIGS. 4 through 7, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 4:
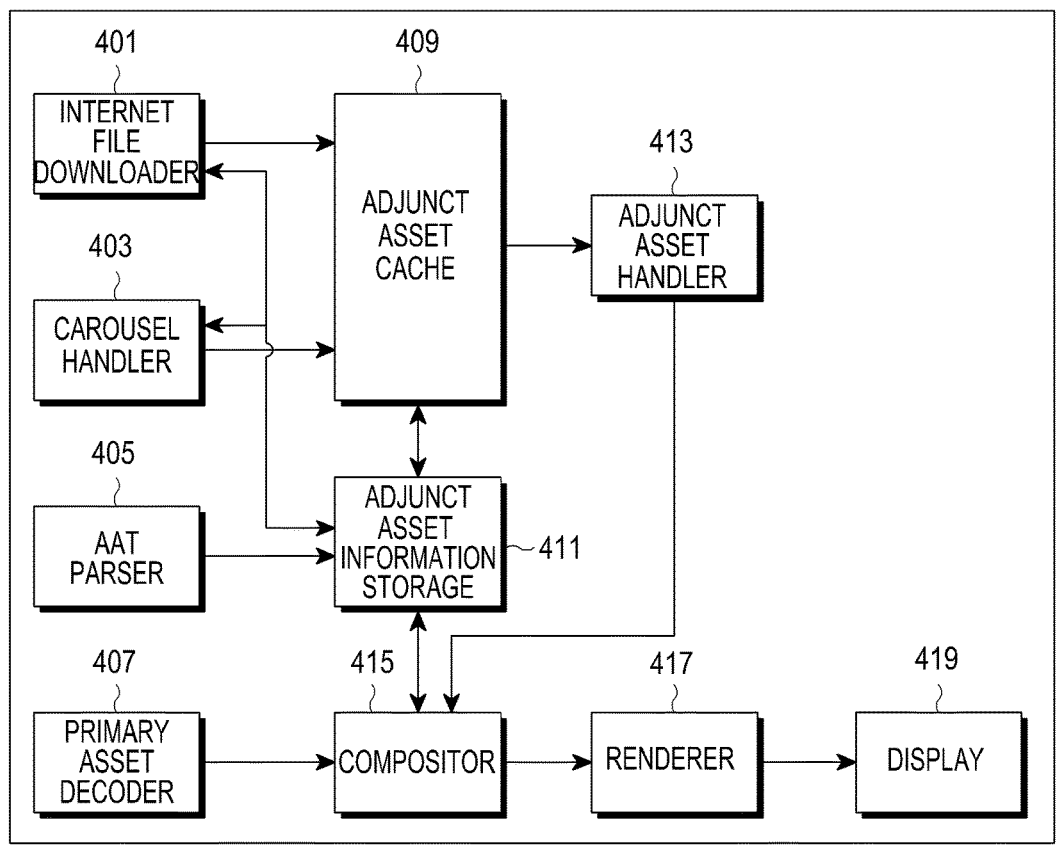
FIG. 4 illustrates a receiver for adjunct asset synchronization according to an exemplary embodiment of the present invention.

FIG. 4 illustrates a receiver for adjunct asset synchronization according to an exemplary embodiment of the present invention.

Referring to FIG. 4, a receiver may include an Internet file downloader 401, a carousel handler 403, an Adjunct Asset Table (AAT) parser 405, a primary asset decoder 407, an adjunct asset cache 409, an adjunct asset information storage 411, an adjunct asset handler 413, a compositor 415, a renderer 417, and a display 419.

Description information about all adjunct assets, as control information, is transmitted to a reception side as a control information stream separate from a primary asset. The control information stream may include an AAT. The AAT parser 405 parses an AAT from the control information stream received from a broadcast network, and stores the parsed AAT in the adjunct asset information storage 411. The AAT may include information for each adjunct asset, such as an identifier (adjunct_asset_id), a type (adjunct_asset_type), an execution attribute (execution_attribute), a capability of a receiver capable of reception (handler_capability), an adjunct asset location (adjunct_asset_locator), a required storage space (required_storage), an expiration date (expiration), a position on a display (display_position), and the like. The adjunct_asset_id is an identifier for identifying an adjunct asset, and may define the adjunct asset uniquely globally or in a media service. The adjunct_asset_locator designates a location from which resource data corresponding to an adjunct asset is read. If the same source data can be read from multiple locations, the AAT may include multiple adjunct_asset_locators for an adjunct asset. Examples of the location designated by the adjunct_asset_locator may be various carousels (i.e., a Digital Storage Media-Command and Control (DSM-CC) data carousel, a DSM-CC object carousel, File Delivery Over Unidirectional Transport (FLUTE), and the like), an Internet URL, and the like. In FIG. 4, the Internet file downloader 401 downloads an adjunct asset file from an Internet URL by referring to the adjunct_asset_locator stored in the adjunct asset information storage 411. The carousel handler 403 downloads an adjunct asset through an object carousel of a broadcast network by referring to the adjunct_asset_locator stored in the adjunct asset information storage 411. The downloaded adjunct asset is stored in the adjunct asset cache 409 after a cache internal file path is designated, and the designated cache internal file path is stored in a file_path_in_cache field of the adjunct asset information storage 411.

To synchronize an adjunct asset with a regular asset, the adjunct_asset_id is inserted into an M-Unit header of a primary asset. Since the M-Unit header includes a Presentation Timestamp (PTS), the PTS included in the M-Unit header may be used as a PTS indicating an execution time point of the adjunct asset identified by the adjunct_asset_id included in the M-Unit header, without any further calculation. Since a video M-Unit may have a frame, a slice, or slices from the same frame, for the primary asset which is video, this synchronization method can achieve video-frame-wise synchronization. If an audio frame has a length of 24 ms, when the primary asset is audio, that is, when the adjunct_asset_id is inserted into an audio M-Unit header, the method can achieve synchronization in 24-ms units. If one or more adjunct assets need to be executed at the same time, the same M-Unit header may include multiple adjunct_asset_ids whose number is equal to that of the adjunct assets. The M-Unit header may also include an adjunct_asset_control field for controlling an adjunct asset which is being executed. The adjunct_asset_control may deliver a command for running the adjunct asset or killing the running adjunct asset.

When the receiver receives a primary asset stream over a broadcast network in real time, the primary asset decoder 407 determines if an M-Unit header includes any adjunct_asset_id, determines if running is needed, searches in the adjunct asset information storage 411 for a matching adjunct_asset_id, and refers to information of a corresponding adjunct asset. If the adjunct asset needs to be run, the compositor 415 reads (or fetches) the adjunct asset from the adjunct asset cache 409 and handles it by decoding or decryption through the adjunct asset handler 413, synchronizes the handling result with primary media at a PTS designated in the M-Unit header, composites the adjunct asset at a designated position of a display from the adjunct asset information storage 411, renders the composite result by the renderer 417, and displays the rendering result through the display 419. Synchronization between the primary asset and the adjunct asset in the compositor 417 is achieved by the same presentation_timestamp.

If synchronization information is not delivered due to a transmission error, a corresponding adjunct asset cannot be run. Therefore, to run the adjunct asset or increase a probability of running the adjunct asset in spite of a transmission error, the same adjunct_asset_id may be included in multiple primary asset M-Unit headers. For example, by repetitively inserting a 'run' or 'kill' command for an adjunct asset into headers of four or five adjacent primary asset M-Units, a probability of running the adjunct asset can be increased. In this case, if a time point into which the first adjunct_asset_id is inserted is an intended execution time point, the execution time point may be delayed slightly due to a transmission error. If the adjunct asset is an interactive application, such an execution delay may not affect Quality of Experience (QoE) of a viewer.

If the adjunct asset is a partial media stream for stereoscopic video, accurate frame-wise synchronization is needed, such that the above method cannot be used. In this case, sync_count may be inserted into an M-Unit header to count down to a synchronization time point. For example, by sequentially delivering '3', '2', '1', and '0' as sync_count in four consecutive primary asset M-Unit headers, a receiver can recognize an accurate synchronization time point. If a time point at which sync_count is '0' is an intended synchronization time point, only the M-Unit header in which sync_count is '2' is received due to a transmission error, and none of the M-Unit headers including the other sync_counts is received. Thereafter, a PTS of the second M-Unit after the current M-Unit is the execution time point of the adjunct asset. To apply this method to a video M-Unit, sync_count has to be inserted into only an M-Unit including the first slice of a frame or the same sync_count is inserted into M-Units obtained from slices included in the same frame. The receiver recognizes a PTS of a frame after frames corresponding to sync_count as the execution time point of the adjunct asset.

An AAT according to an exemplary embodiment of the present invention will be described below.

A syntax of the AAT is as shown in Table 1 below. A definition of the content in a 'format' column complies with the MPEG-2 system standard (International Organization for Standardization (ISO)/International Electrotechnical Commission (IEC) 13818-1:2007). A loop count not shown in a 'value' column of Table 1 is a value induced from values indicating length. Herein, the same principle is also applied to other tables.

TABLE 1

| Syntax | Value | No. of bits | Format |
|---|---|---|---|
| adjunct_asset_table() { | | | |
|   table_id | | 8 | uimsbf |
|   version_id | | 8 | uimsbf |
|   sub_table_id | | 10 | uimsbf |
|   update_version | | 6 | uimsbf |
|   table_length | | 16 | uimsbf |
|   locator_prefix_count | N1 | 8 | uimsbf |
|   for (i=0; i<N1; i++) { | | | |
|     locator_prefix_length | N2 | 8 | uimsbf |
|     for (j=0; j<N2; j++) { | | | |
|       locator_prefix_byte | | 8 | uimsbf |
|     } | | | |
|   } | | | |
|   for (i=0; i<N3; i++) { | | | |
|     adjunt_asset_type | | 16 | uimsbf |
|     adjuct_asset_count_minus1 | N4 | 8 | uimsbf |
|     for (j=0; j<N4+1; j++) { | | | |
|       adjunct_asset_id { | | | |
|         provider_idendifier | | 32 | uimsbf |
|         asset_identifier | | 16 | uimsbf |
|       } | | | |
|       execution_attribute { | | | |
|         execution_on_reception | | 1 | bslbf |
|         media_service_bound | | 1 | bslbf |
|         execution_entry_point | | 1 | bslbf |
|         reserved | '1' | 1 | bslbf |
|         visible_to_user | | 2 | bslbf |
|         secure_execution | | 2 | bslbf |
|         adjunct_asset_priority | | 8 | uimsbf |
|       } | | | |
|       reserved | 0x3F | 6 | bslbf |
|       adjunct_asset_locator_count_minus1 | N5 | 2 | uimsbf |
|       for (k=0; k<N5+1; k++) { | | | |
|         adjunct_asset_locator() | | | |
|       } | | | |
|       adjunct_asset_descriptors_length | | 16 | uimsbf |
|       for (k=0; k<N6; k++) { | | | |
|         adjunct_asset_descriptor() | | | |
|       } | | | |
|     } | | | |
|   } | | | |
|   CRC_332 | | 32 | rpchof |
| } | | | |

In Table 1, each field has the following semantics:

table_id: An identifier indicating a type of a table. It assigns a unique value corresponding to the AAT.

version_id: An identifier indicating the structure of the AAT. If the structure of the table is modified by an amendment of this standard, the value of this field is also changed. A receiver, by looking into the value of this field, determines whether the receiver can understand this table.

sub_table_id: When the table is divided into several sub-tables for transmission, this field identifies each sub-table.

update_version: The AAT is periodically transmitted, such that if the content of the AAT is different from that of the most recently transmitted AAT having the same sub_table_id, this value of this field is incremented. After a maximum value of '15', the value is changed into '0'. A receiver reads and parses the content of the AAT again if the value of this field is changed.

table_length: The number of bytes from the next field to the last byte of the AAT. The value '0' is not used.

locator_prefix_count: The number of following locator_prefix strings. The locator_prefix is concatenated by adding '/' to the end thereof in front of a locator string provided in the adjunct_asset_locator, thus forming an URL. In the adjunct_asset_locator, the locator_prefix is referred to by using an appearing order of the locator_prefix as an index. The value '0xFF' is not used for this field. Therefore, a maximum of 255 locator_prefixs may be included.

locator_prefix_length: A length of a locator_prefix string.

locator_prefix_byte: A byte in a locator_prefix string. The terminating null byte shall not be included in the locator_prefix string.

adjunct_asset_type: A type of adjunct assets. For example, a unique value is allocated to each type, such as web documents, widgets, interactive applications, audio clips, video clips, graphics, texts, images, auxiliary media components, and the like. This adjunct_asset_type value is equally applied to adjunct assets in the following syntax loop.

adjunct_asset_count_minus1: A value less by one than the number of adjunct assets described in the following syntax loop. This value can indicate a maximum of 256 adjunct assets. If the number of adjunct assets having the same adjunct_asset_type exceeds 256, those adjunct assets are described using two or more syntax loops.

adjunct_asset_id: A globally unique identifier of 48 bits for identifying an adjunct asset. The uniqueness is maintained only for a predefined time, and after the predefined time, the identifier can be reused. To be a global identifier, this field is divided into two parts: a 32-bit provider_identifier and a 16-bit asset_identifier. The provider_identifier is assigned by a registration authority and registered for each provider, and the asset_identifier is managed by each provider.

execution_attribute: This field indicates how a receiver, upon receiving an adjunct asset, executes the adjunct asset, and includes the following fields:

execution_on_reception: A flag indicating whether to "immediately execute" an adjunct asset received by the receiver after storing the adjunct asset in an adjunct asset cache. If the adjunct asset is not immediately executed, it may be executed at a time point designated by the synchronization method suggested in the exemplary embodiment of the present invention, upon a user's selection or upon being called from another adjunct asset. If this flag is '1', execution_entry_point is also set to '1'.

media_service_bound: A flag indicating whether the adjunct asset is media-service-bound. If this flag is '1', it indicates that the adjunct asset is bound to the media service, and the adjunct asset is automatically terminated when a broadcast channel change occurs.

execution_entry_point: A flag indicating that the adjunct asset can be directly executed. If this flag is '0', the adjunct asset is indirectly executed by another adjunct asset.

visible_to_user: A 2-bit field indicating whether a user can selectively execute the adjunct asset by using an adjunct asset navigation function or whether the adjunct asset is visible when another adjunct asset navigates an adjunct asset list through an Application Programming Interface (API) provided by the receiver. The semantics of the visible_to_user are as shown in Table 2 and Table 3 below.

TABLE 2

| Value | Semantics |
|---|---|
| 0b00 | This adjunct asset can neither be selectively executed by a user using an adjunct asset navigation function nor be visible when another adjunct asset navigates an adjunct asset list through an API provided by a receiver |
| 0b01 | This adjunct asset cannot be selectively executed by a user using an adjunct asset navigation function, but is visible when another adjunct asset navigates an adjunct asset list through an API provided by a receiver |
| 0b10 | reserved for future use |
| 0b11 | This adjunct asset can be selectively executed by a user using an adjunct asset navigation function, and is visible when another adjunct asset navigates an adjunct asset list through an API provided by a receiver |

TABLE 3

| Value | Semantics |
|---|---|
| 0b00 | trusted |
| 0b01 | untrusted |
| 0b10 | privileged |
| 0b11 | reserved for future use | adjunct_asset_priority: A field indicating the execution priority of the adjunct asset. The higher value of adjunct_asset_priority means the higher priority. When receiver resources for executing the adjunct asset are insufficient, the adjunct asset with the lowest priority among the currently executed adjunct assets is first paused or terminated.

adjunct_asset_locator_count_minus1: A value less by one than the number of locations from which the adjunct asset is to be read. A maximum of 4 locations can be provided using 2 bits. When two or more locations are provided, the order of appearance of adjunct_asset_locator is the priority. One or more adjunct_asset_locator appear.

adjunct_asset_locator: This syntax element group provides information of a location from which the adjunct asset is to be read.

adjunct_asset_descriptors_length: This field provides the number of bytes in the range from the next byte to the last byte of the following descriptors syntax loop.

adjunct_asset_descriptor: Various descriptors may be included in this descriptor syntax loop.

Cyclic Redundancy Code (CRC)_32: The same field as CRC_32 defined in the section syntax of the MPEG-2 system standard (ISO/IEC 13818-1:2007).

The adjunct asset location information (adjunct_asset_locator) will be described below.

The resource data location information, adjunct_asset_locator, indicates a location from which the adjunct asset is to be read. The adjunct asset is delivered through a carousel of a broadcast network or is downloaded over the Internet. The AAT needs to include one or more adjunct_asset_locators for each adjunct asset. The receiver reads the adjunct asset from a location designated by the first appearing adjunct_asset_locator, and if an error occurs, the receiver reads the adjunct asset from a location designated by the next adjunct_asset_locator.

The syntax of the adjunct_asset_locator is as shown in Table 4 below. Table 4 includes only the Internet case, and for the carousel case, the syntax may vary according to the carousel. Therefore, for the purpose of the present specification, details are not included in Table 4.

TABLE 4

| Syntax | Value | No. of bits | Format |
|---|---|---|---|
| adjunct_asset_locator() { | | | |
|   locator_type | | 8 | uimsbf |
|   locator_prefix_index | | 8 | uimsbf |
|   if (locator_type == 0x01) { // Internet | | | |
|     directory_path_length | N1 | 8 | uimsbf |
|     for (i=0; i<N1; i++) { | | | |
|       directory_path_byte | | 8 | uimsbf |
|     } | | | |
|     entry_path_length | N2 | 8 | uimsbf |
|     for (i=0; i<N2; i++) { | | | |
|       entry_path_byte | | 8 | uimsbf |
|     } | | | |
|     object_count | N3 | 8 | uimsbf |
|     for (i=0; i<N3; i++) { | | | |
|       object_path_length | N4 | 8 | uimsbf |
|       for (j=0; j<N4; j++) { | | | |
|         object_path_byte | | 8 | uimsbf |
|       } | | | |
|     } | | | |
|   } else if (locator_type == 0x02) { // carousel type A | | | |
|     ... // conent defined differently according to carousel | | | |
|   } else { // carousel type B | | | |
|     ... | | | |
|   } | | | |
| } | | | |

The semantics of each field of Table 4 are provided below.

locator_type: An 8-bit field indicating whether a location from which the adjunct asset is to be read is Internet or a carousel of a broadcast network, and indicating a carousel type if the location is a carousel and various types of carousels are used together.

locator_prefix_index: An index designating one of the locator_prefixes of Table 1. If the value of this field is '0xFF', this means that the locator_prefix is not used.

directory_path_length: A length of the following directory path. The terminating null byte of a string is not included. If the value of this field is '0', the directory path is not used.

directory_path_byte: A byte of a directory path. The terminating null byte of a string is not included.

entry_path_length: A length of the following path of the initial page file. The terminating null byte of a string is not included. This field has a meaning only when the adjunct asset includes multiple files, such as a web page. If the adjunct asset is a single file, this field has a value of '0'.

entry_path_byte: A byte of the path of the initial page file. The terminating null byte of a string is not used.

object_count: The number of following paths for files. If this field has a value of '0', the entire directory is designated.

object_path_length: A length of a string of the following file path. The terminating null byte of the string is not included.

object_path_byte: A byte of a file path. The terminating null byte of the string is not included.

For example, a URL configuration using Internet adjunct asset location information may be as follows. The adjunct asset of this example is a web page including multiple files.

If the locator_prefix of Table 1 is "http://www.example.com", the directory path is "interactive_applications/app0001", the entry path is "index.htm", and the object_count has a value of '0', then all resources of the adjunct asset are in the directory of "www.example.com/interactive_ applications/app0001", and the URL of the initial page is "http://www.example.com/interactive_applications/app0001/index.htm".

Hereinafter, the adjunct_asset_descriptor will be described. The adjunct_asset_descriptor of Table 1 may include various descriptors. A handler_capability_descriptor( ) indicating the capability of the receiver capable of handling the adjunct asset, an adjunct_asset_cache_descriptor( ) indicating the memory capacity for adjunct asset cache management, expiration date, and the like, a display_position_descriptor( ) indicating a position on a display on which the adjunct asset is to be presented on the screen, an adjunct_asset_name_descriptor( ) providing the name of the adjunct asset to be displayed to a user, an adjunct_asset_icon_descriptor( ) indicating providing the icon of the adjunct asset to be displayed to the user, and the like may be the descriptors. These descriptors are not related to synchronization between the primary asset and the adjunct asset, and thus for the purpose of the present specification, the syntaxes of the descriptors and semantics thereof are not provided herein.

Hereinafter, adjunct asset synchronization information of an M-Unit header will be described. Other fields of the M-Unit header to be defined in an MMT will be omitted, and focusing on fields which need to be added in relation to a technique proposed herein, that is, adjunct_asset_sync_info, the syntax of the M-Unit header and semantics of respective fields will be described. The syntax of the M-Unit header is as shown in Table 5 below.

TABLE 5

| Syntax | Value | No. of bits | Format |
|---|---|---|---|
| M_unit_header() { | | | |
| ... // other fields of M-Unit header | | | |
| presentation_timestamp | | | |
| ... // other fields of M-Unit header | | | |
| adjunct_asset_sync_info { | | | |
|   adjunct_asset_count | N1 | 4 | bslbf |
|   reserved | 0xF | 4 | bslbf |
|   if (adjunct_asset_count > 0) { | | | |
|     for (i=0; i<N1; i++) { | | | |
|       adjunct_asset_id() | | 48 | uimsbf |
|       adjunct_asset_control | | 4 | uimsbf |
|       sync_count | | 4 | uimsbf |
|     } | | | |
|   } | | | |
| } | | | |
| ... // other fields of M-Unit header | | | |
| } | | | |

The respective fields of Table 5 have the following semantics:

adjunct_asset_count: If the value of this field is greater than '0', it means that there is an adjunct asset which shall be synchronized with this M-Unit.

adjunct_asset_id: An identifier of the adjunct asset which shall be synchronized with this M-Units. The format of this field is as prescribed in Table 1 above.

adjunct_asset_control: A field indicating the type of control to be applied to the adjunct asset.

The semantics of the value are as shown in Table 6 below.

TABLE 6

| Value | Semantics |
|---|---|
| 0b0000 | 'run' (to execute the adjunct asset) |
| 0b0001~0b1110 | Reserved for future use |
| 0b1111 | 'kill' (to terminate the adjunct asset) | sync_count: A field indicating a synchronization time point when adjunct_asset_sync_info is consecutively inserted in headers of multiple M-Units to improve resistance against a transmission error. This field has a value from '0' to '15'. The M-Unit having '0' as the value of this field is the time point at which the adjunct asset is synchronized. For example, presentation_timestamp included in the M-Unit having the field value of '0' is the execution time of control of the adjunct asset. To accurately achieve synchronization without a delay caused by a transmission error by using this field, insertion of the adjunct_asset_sync_info starts prior to the synchronization time point and the adjunct_asset_sync_info is repetitively inserted consecutively in the M-Unit headers until sync_count is decremented one-by-one down to '0' from a positive value selected below '15'. If some delay is allowed due to a transmission error, the adjunct_asset_sync_info is repetitively inserted consecutively in the M-Unit headers while fixing sync_count to '0'. When the receiver repetitively receives the M-Unit having sync_count of '0' for the same adjunct_asset_control value with respect to an adjunct asset, it executes the first received control command and ignores the next received commands.

Figure 5:
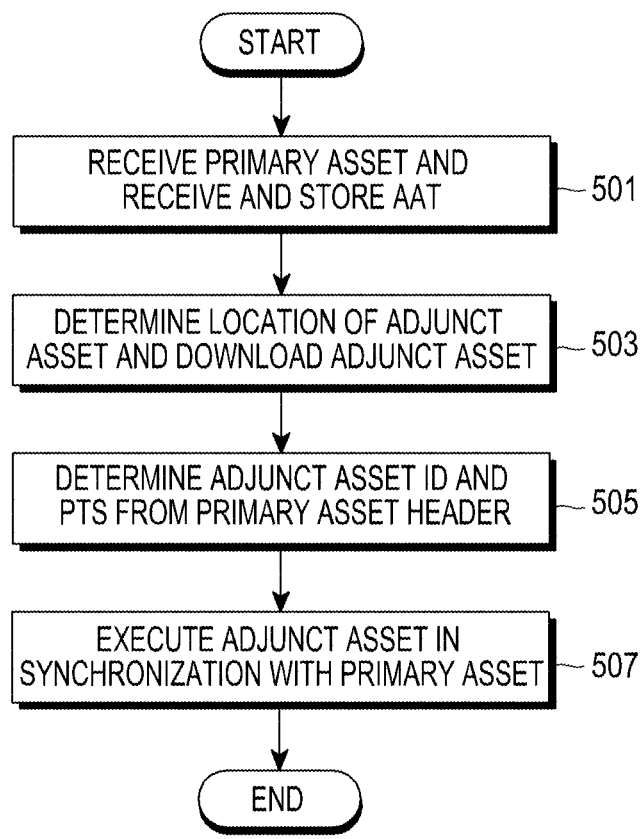
FIG. 5 is a flowchart of a synchronization method in a receiver according to an exemplary embodiment of the present invention.

FIG. 5 is a flowchart of a synchronization method in a receiver according to an exemplary embodiment of the present invention.

Referring to FIG. 5, in step 501, the receiver receives a primary asset stream from a transmission side over a broadcast network, receives control information including an AAT separately from the primary asset stream, parses the AAT, and stores the AAT in an adjunct asset information storage. In step 503, the receiver determines an adjunct_asset_locator from the stored AAT to download an adjunct asset file through an Internet URL or an object carousel of the broadcast network according to the value of the adjunct_asset_locator, and stores the adjunct asset file in an adjunct asset cache. In step 505, the receiver determines an adjunct_asset_id and a PTS in an M-Unit header of the primary asset stream. The receiver then searches in the adjunct asset information storage for information about an adjunct asset matched to the adjunct_asset_id, reads the adjunct asset from the adjunct asset cache. Thereafter, in step 507, the receiver executes the adjunct asset in synchronization with a primary asset at a time point indicated by the PTS.

A media data synchronization method according to another exemplary embodiment of the present invention will be described below.

In another exemplary embodiment of the present invention, an MPU_Identifier (MMT Processing Unit Identifier) of an MPU header, defined in 'M24227, Proposed text of Working Draft for MPEG Media Transport, Geneva, Switzerland, April 2012' is used. According to the M24227 document, the MPU_Identifier includes a Random Access Point Flag (RAP Flag) and a mpu_sequence_number. The mpu_sequence_number is a unique value within an MMT asset and is incremented by 1 per MPU. Hence the mpu_sequence_number can be used to uniquely designate the time point at which different assets are synchronized. The range of the uniqueness of the mpu_sequence_number may be adjusted if needed, and for example, the uniqueness thereof may be maintained in one day. To satisfy the range of uniqueness, the length of the mpu_sequence_number may be changed. Other advantages of using the mpu_sequence_number for adjunct asset synchronization are error resiliency and prediction of the synchronization time point. Since the mpu_sequence_number is incremented by 1 per MPU, the receiver can find a proper time point and perform adjunct asset synchronization, in spite of MPU loss. In addition, when the receiver needs to predict the synchronization time point due to a need for prior provisions before adjunct asset synchronization, it can easily predict the synchronization time point by using the current mpu_sequence_number. In the M24227 document of the MPEG, there are information of content and CI used for temporal-spatial arrangement and synchronization. In the CI, a "begin" attribute is used for asset synchronization. An exemplary embodiment of the present invention proposes addition of "MPU-Sequence-Number-Value" to the "begin" attribute.

The MPU-Sequence-Number-Value is defined as follows:
MPU-Sequence-Number-value ::=Id_value ".MPU(" mpu_sequence_number ")" ["+" |"−" frame_offset "fra"]

The terms used in the above definition can be defined as provided below:
Id_value: An Extensible Markup Language (XML) identifier of a primary asset to which an adjunct asset is to be synchronized.
Mpu_sequence_number: A sequence number of an MPU which includes synchronization time point information.
Frame_offset: This field is used when a primary asset and an adjunct asset to be synchronized are both video or audio. In a case of an audio frame, the play time point of the first sample in the frame is the synchronization reference time point. Thus, in a case of video, accurate synchronization in frame units is possible. However, in a case of audio, there may be an error of up to ½ of an audio frame. A relative value from the mpu_sequence_number is applied to indicate the synchronization time point. '+5' means that synchronization needs to be performed with the fifth frame from the first frame in display order within the MPU indicated by the mpu_sequence_number (that is, the sixth frame in display order within the MPU). '−10' means that a frame in the adjunct asset to be synchronized with the first frame in display order within the MPU indicated by the mpu_sequence_number is the tenth frame from the first frame (that is, the eleventh frame in display order in the adjunct asset).

The current exemplary embodiment of the present invention may be applied to the CI and may be used as in the following example.

If a primary asset is asset 1, an XML id thereof is asset1_id, an adjunct asset is asset 2, and the begin attribute of asset 2 in the CI is:
begin="asset1_id.MPU(123)+5 fra",
then it means that asset 2 needs to be synchronized with asset 1 in the sixth frame within the MPU having mpu_sequence_number=123 among MPUs of asset 1.

According to such an exemplary synchronization method, the primary asset and the adjunct asset can be synchronized without changing the header of the primary asset and the description regarding the primary asset in the CI.

Figure 6:
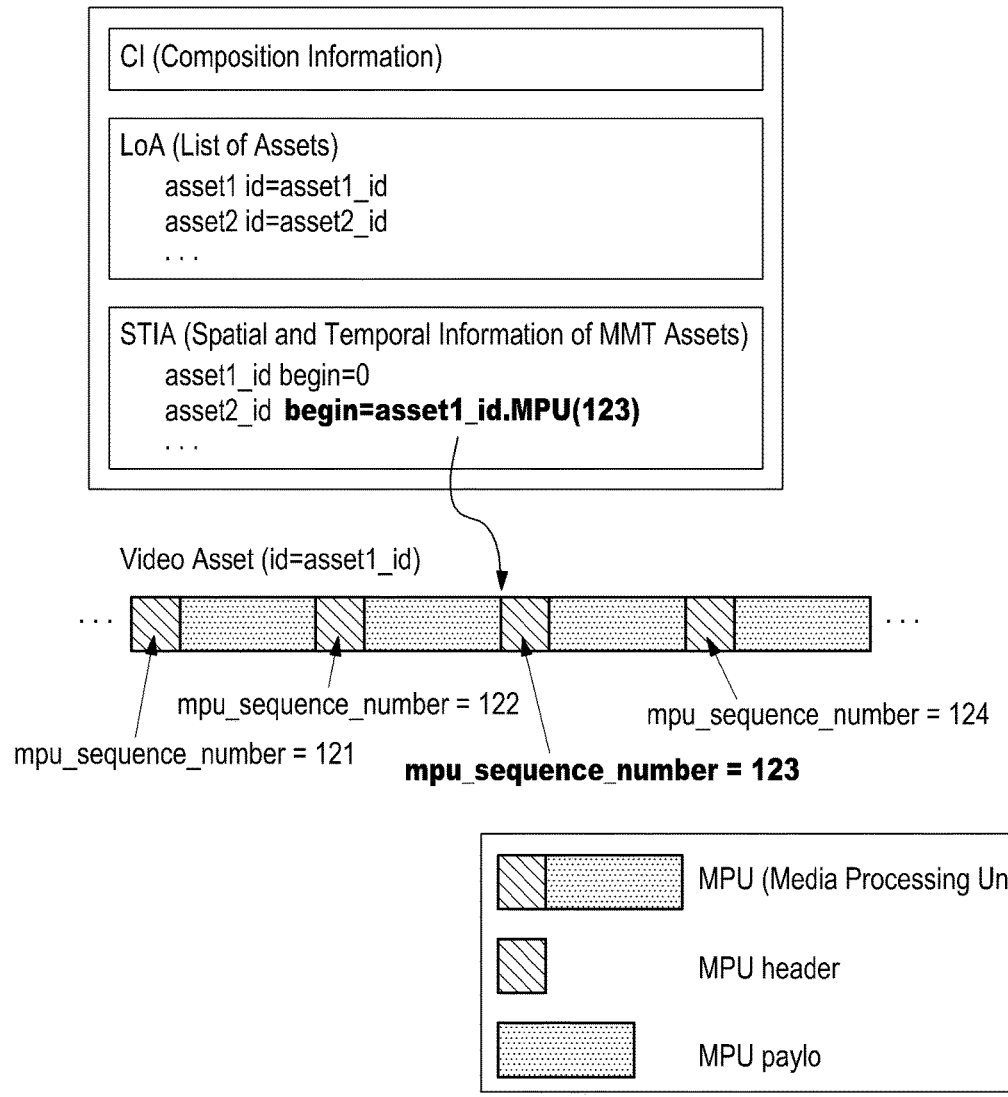
FIG. 6 illustrates a synchronization method in a receiver according to an exemplary embodiment of the present invention.

FIG. 6 illustrates a synchronization method in a receiver according to an exemplary embodiment of the present invention.

Referring to FIG. 6, a CI includes a List of Assets (LoA) and Spatial and Temporal Information of MMT Assets (STIA). The LoA includes a list of assets included in a package and an id of each asset. In FIG. 6, asset1_id is a primary asset, for example, video data, and asset2_id is an adjunct asset, e.g., image data. The STIA includes description regarding each asset. In FIG. 6, the begin attribute value of asset1_id is '0', and the begin attribute value of asset2_id is 'asset1_id.MPU(123)'.

When the receiver synchronizes data, the receiver determines description of the adjunct asset included in the CI and determines how to synchronize the adjunct asset with the primary asset through the begin attribute. In FIG. 6, asset1_id and asset2_id are synchronized at a start point of an MPU having mpu_sequence_number=123 among MPUs of asset1_id.

Figure 7:
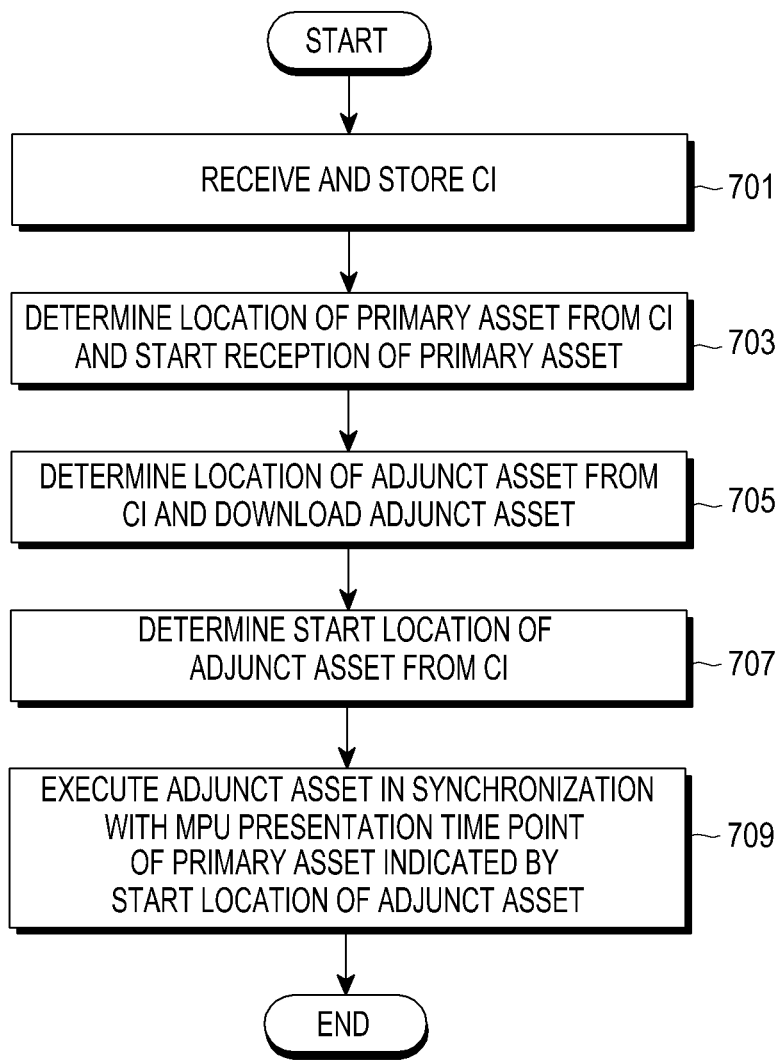
FIG. 7 is a flowchart of a synchronization method in a receiver according to an exemplary embodiment of the present invention.

FIG. 7 is a flowchart of a synchronization method in a receiver according to an exemplary embodiment of the present invention.

Referring to FIG. 7, the receiver receives a CI from a transmission side and stores the received CI in the adjunct asset information storage in step 701. The receiver determines a location of a primary asset from the stored CI and receives a primary asset stream in step 703. In step 705, the receiver determines a location of an adjunct asset from the CI, downloads an adjunct asset file, and stores the adjunct asset file. In step 707, the receiver determines description regarding the downloaded adjunct asset in the CI, and determines a start location of the adjunct asset through the begin attribute in the description. In step 709, the receiver reads the adjunct asset from the adjunct asset information storage and executes the adjunct asset in synchronization with the location of the primary asset indicated by the being attribute, that is, an MPU sequence number.

According to exemplary embodiments of the present invention, synchronization between regular media and adjunct media can be achieved in a simple way without a need for a reception side to configure a media timeline, such that the receiver does not need to configure, maintain, and manage the media timeline, and a transmission side does not need to transmit control information for the media timeline. Moreover, the receiver has no burden of periodically reading and handling the control information.

While the invention has been shown and described with reference to certain exemplary embodiments thereof, it will be understood by those skilled in the art that various changes in forms and details may be made therein without departing from the spirit and scope of the invention as defined by the appended claims and their equivalents.

What is claimed is:
1. A method for synchronizing data in a multimedia broadcast service, the method comprising:
  receiving composition information (CI) for a broadcast service, the CI comprising synchronization information for adjunct media data, the adjunct media data comprising auxiliary data regarding regular media data;
  receiving the regular media data and the adjunct media data; and
  executing the adjunct media data in synchronization with the regular media data based on the synchronization information,
  wherein a packet stream for the CI is independent of a packet stream for the regular media data,
  wherein the regular media data comprises a plurality of processing data unit,
  wherein the synchronization information comprises:
    an identifier of the regular media data to be synchronized with the adjunct media data, and
    a sequence number of a processing data unit in the regular media data to be synchronized with the adjunct media data, wherein the CI comprises type information of the adjunct media data and network information of the adjunct media data, and
wherein the CI further comprises a control indicator indicating execution of the adjunct media data.

2. The method of claim 1, wherein the synchronization information further comprises a frame offset value of the processing data unit in the regular media data to be synchronized with the adjunct media data.

3. The method of claim 1, wherein the network information includes an indicator that the adjunct media data is received through a broadcast network.

4. The method of claim 1, wherein the network information includes an indicator that the adjunct media data is received through a broadcast network.

5. A reception apparatus for synchronizing data in a multimedia broadcast service, the reception apparatus comprising:
   a decoder configured to receive and decode regular media data for a broadcast service;
   an adjunct media information storage configured to receive and store composition information (CI) for the broadcast service, the CI comprising synchronization information of adjunct media data, the adjunct media data comprising auxiliary data regarding regular media data;
   an adjunct media data cache configured to:
      receive and store the adjunct media data; and
   an executor configured to:
      execute the adjunct media data in synchronization with the regular media data based on the synchronization information,
   wherein a packet stream for the CI is independent of a packet stream for the regular media data,
   wherein the synchronization information comprises an identifier of the regular media data to be synchronized with the adjunct media data, and a sequence number of a processing data unit of the regular media data to be synchronized with the adjunct media data,
   wherein the CI comprises type information of the adjunct media data and network information of the adjunct media data, and
   wherein the CI further comprises a control indicator indicating execution of the adjunct media data.

6. The reception apparatus of claim 5, wherein the synchronization information further comprises a frame offset value of the processing data unit in the regular media data to be synchronized with the adjunct media data.

7. The reception apparatus of claim 5, wherein the network information includes an indicator that the adjunct media data is received through a broadcast network, and
   wherein the reception apparatus further comprises:
      a carousel handler configured to:
         receive the adjunct media data from the broadcast network,
         handle the received adjunct media data, and
         store the handled adjunct media data in the adjunct media data cache.

8. The reception apparatus of claim 5, wherein the network information includes an indicator that the adjunct media data is received through a broadcast network, and
   wherein the reception apparatus further comprises:
      a downloader configured to:
         download the adjunct media data from the broadcast network, and
         store the adjunct media data in the adjunct media data cache.

* * * * *